(12) United States Patent
Dunfee, II et al.

(10) Patent No.: US 9,556,955 B2
(45) Date of Patent: Jan. 31, 2017

(54) FULL CLUTCH SLIP POWER SHIFT OF A DUAL CLUTCH TRANSMISSION

(71) Applicant: Eaton Corporation, Cleveland, OH (US)

(72) Inventors: Jeffrey S. Dunfee, II, Kalamazoo, MI (US); Thomas R. Connolly, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 94 days.

(21) Appl. No.: 14/590,324

(22) Filed: Jan. 6, 2015

(65) Prior Publication Data

US 2015/0226321 A1 Aug. 13, 2015

Related U.S. Application Data

(60) Provisional application No. 61/938,317, filed on Feb. 11, 2014.

(51) Int. Cl.
*F16H 61/08* (2006.01)
*F16H 61/688* (2006.01)
(Continued)

(52) U.S. Cl.
CPC ............. *F16H 61/08* (2013.01); *F16D 48/062* (2013.01); *F16D 48/08* (2013.01);
(Continued)

(58) Field of Classification Search
None
See application file for complete search history.

(56) References Cited

U.S. PATENT DOCUMENTS 4,947,970 A * 8/1990 Miller ................... F16D 48/066
477/30
5,020,649 A * 6/1991 Eastcott ................ F16D 25/046
192/48.1

(Continued)

FOREIGN PATENT DOCUMENTS

| DE | 10043060 A1 | 4/2002 |
|----|-------------|--------|
| EP | 1382479 A2 | 1/2004 |
| EP | 1450074 A2 | 8/2004 |

OTHER PUBLICATIONS

International Search Report for PCT/IB2015/051035 dated May 7, 2015, 5 pages.
(Continued)

*Primary Examiner* — Edwin A Young
(74) *Attorney, Agent, or Firm* — Fishman Stewart PLLC

(57) ABSTRACT

A system for operating a dual clutch transmission, including launch/creep controller, shift logic, and a clutch control assembly. The shift logic is configured to intercept a torque command including a target clutch torque from the launch/creep controller as it transmits the target clutch torque to the clutch assembly. The shift logic engages a preparation phase that increases torque on an on-coming clutch to a prefill torque. The shift logic then engages a torque phase that transfers torque between the off-going clutch and the on-coming clutch by simultaneously decreasing the off-going clutch torque and increasing the on-coming clutch torque. The off-going clutch and the on-coming clutch remain in a slipping state that maintains the target clutch torque during the transfer.

20 Claims, 3 Drawing Sheets

(51) Int. Cl.
   *F16D 48/08*    (2006.01)
   *F16H 61/04*    (2006.01)
   *F16D 48/06*    (2006.01)
(52) U.S. Cl.
   CPC ....... F16H 61/0437 (2013.01); F16H 61/688 (2013.01); *B60Y 2300/18025* (2013.01); *B60Y 2300/18058* (2013.01); *F16D 2500/30404* (2013.01); *F16D 2500/50206* (2013.01); *F16D 2500/50212* (2013.01); *F16D 2500/50224* (2013.01); *F16D 2500/50287* (2013.01); *F16D 2500/7044* (2013.01); *F16D 2500/70488* (2013.01); *F16H 2312/02* (2013.01); *F16H 2312/06* (2013.01)

(56) References Cited

U.S. PATENT DOCUMENTS

| | | | |
|---|---|---|---|
| 8,079,936 B2* | 12/2011 | MacFarlane | F16D 48/06 477/107 |
| 2012/0129652 A1* | 5/2012 | Reuschel | F16D 48/06 477/71 |
| 2013/0081491 A1 | 4/2013 | Arai | |

OTHER PUBLICATIONS

English Abstract for EP1382479 dated Jan. 21, 2004.
English Abstract for DE10043060.

* cited by examiner

FULL CLUTCH SLIP POWER SHIFT OF A DUAL CLUTCH TRANSMISSION

CROSS-REFERENCE TO RELATED APPLICATIONS

This Application claims the benefit of U.S. Provisional Application 61/938,317, filed on Feb. 11, 2014, which is hereby incorporated by reference in its entirety.

BACKGROUND

Vehicles incorporating automatic transmissions shift automatically between gears in the transmission in response to changes in a throttle input, often associated with adjustments to a linked accelerator pedal. When a driver adjusts the accelerator pedal, these changes affect the throttle input, and in turn results in adjusting automatic transmission operationally connected to an engine and responding to the throttle inputs to find the appropriate gear. There are different types of shifting scenarios including power on/off upshifting and power on/off downshifting. Power On shifting refers to shifting into a higher gear (upshifting) or a lower gear (downshifting) when the accelerator pedal is depressed. Power Off shifting refers to shifting into a higher gear (upshifting) or a lower gear (downshifting) when the accelerator pedal is released.

One form of automatic transmission utilizes a dual clutch in order to shift between gears. In these dual clutch transmissions, there is commonly an off-going clutch that is engaged to and driving the present gear and an on-coming clutch that is used to engage the gear to be shifted into (upshifting or downshifting). Complications in smooth shifting can arise during difficult shifting scenarios. Launch shifting occurs when a vehicle is accelerated from idle and a drive gear shift occurs during the launch itself. When the clutch overheats during a launch or an less than optimum gear is initially selected at launch, a power shift must typically disconnect on off-going gear and activate an on-coming gear. This may result in a torque disturbance to the transmission between the disconnect of the off-going clutch and the re-engagement of the on-coming clutch. This torque disturbance can result in a rough shift and undesirable performance. Similar torque disturbances may result when coming to a stop on a grade with the throttle on and a gear shift is necessitated. In such a situation, while the vehicle is creeping forward it may be necessary to downshift into a lower gear while still powering forward. Again, the disturbance in torque may result in a rough shift and undesirable performance.

It may be desirable for a solution that would reduce the disturbance in transmission torque during power launch shifting situations where environmental conditions or improper gear selection necessitate a gear shift. It would additionally be desirable for a technique that would further reduce transmission torque disturbances during situations where a vehicle may be creeping to a stop on a grade and a change in gear is indicated.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

A dual clutch transmission in a commercial vehicle is disclosed with the capability to power shift between gears without breaking the output transmission torque while both clutches are in a continuously slipping state. Moreover, the disclosed shifting provides a quick and smooth shift quality even when shifting during a launch or when shifting when coming to a stop on a grade. To accomplish this, the dual clutch transmission may employ exemplary preparation phase techniques. In addition, the dual clutch transmission may employ exemplary power shift torque phase techniques in communication with a launch/creep controller to transfer from an off-going clutch to an on-coming clutch without breaking transmission torque.

A launch/creep controller generates a torque command that includes a target clutch torque. The shift logic intercepts this target clutch torque. The shift logic may implement an exemplary preparation phase technique that includes a pre-fill loading of the on-coming clutch to a pre-fill torque. The exemplary preparation phase may also include unlocking the off-going clutch. The shift logic may also employ an exemplary torque phase technique. The exemplary torque phase technique may increase torque to the on-coming clutch while simultaneously decreasing torque to the off-going clutch. The combination of the off-going clutch torque and the on-coming clutch torque is used to maintain the target clutch torque during the torque handover that transfers torque from the off-going clutch to the on-coming clutch. Both the off-going clutch and the on-coming clutch are maintained in a slipping state during the torque handover. This allows a quick and smooth transition between the off-going clutch and the on-coming clutch without a break in the target clutch torque during launch and creep shift scenarios.

Figure 1:
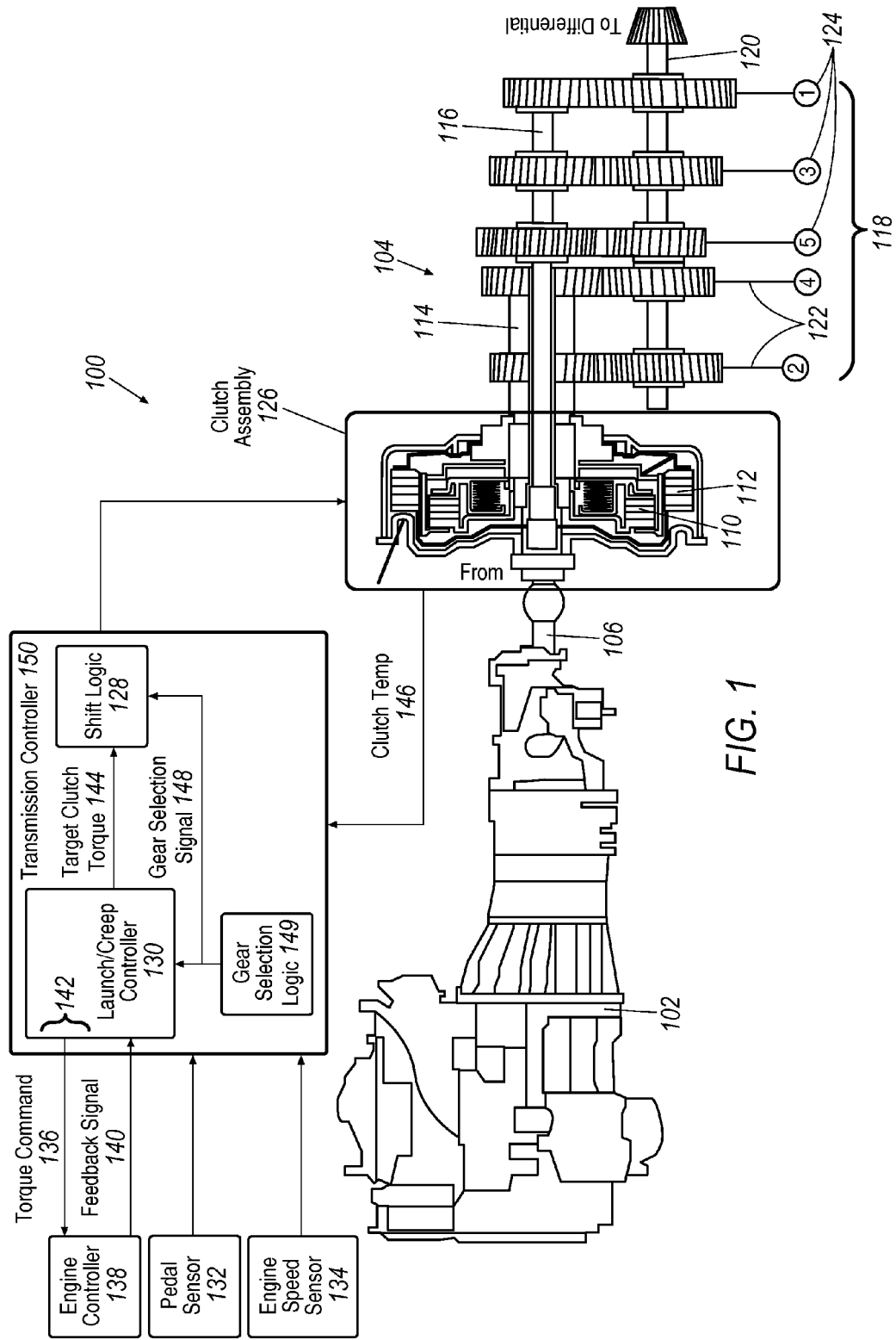
FIG. 1 is an exemplary illustration of a dual clutch transmission.

Referring now to FIG. 1, an engine driveline assembly 100 for a vehicle is shown. The driveline assembly 100 generally may include an engine 102 connected to a dual clutch transmission assembly 104 by way of a crankshaft 106. In an exemplary arrangement, the dual clutch transmission assembly 104 includes a clutch case 108 housing a first clutch 110 and a second clutch 112. In this exemplary example, the first clutch 110 communicates with a first (outer) transmission shaft 114 and the second clutch 112 communicates with a second (inner) transmission shaft 116. It should be understood that the illustrated first and second transmission shaft 114, 116 arrangements are illustrative only and do not limit the present disclosure. A plurality of transmission gears 118 are in communication with the first and second transmission shafts 114, 116 as well as a drivetrain 120 in order to selectively transfer drive from the engine 102 to the drivetrain 120. In at least one exemplary illustration, even transmission gears 122 are in communication with the first transmission shaft 114 and therefore the first clutch 110 and the odd transmission gears 124 are in communication with the second transmission shaft 116 and therefore the second clutch 112. A clutch control assembly 126, including an integrated shift logic 128, is in communication with the dual clutch transmission assembly 104 and with the engine 102 to control operation of the engine drive assembly and the selection of specific transmission gears 118.

The shift logic 128 is in communication with a launch/creep controller 130. The launch/creep controller 130 contains inputs from vehicle sensors such as a pedal sensor 132 and an engine speed sensor 134. The launch/creep controller 130 utilizes inputs from the pedal sensor 132 and the engine speed sensor 134 in order to implement a target torque command 136 to engine controller 138 and the clutch control assembly 126 which is intercepted by the shift logic 128 to execute a power launch shift or a powered creep shift. The engine controller 138 utilizes this torque command 136 to control the engine 102. Additionally, the engine controller 138 receives information from the engine 102 and sends a feedback signal 140 back to the launch/creep controller 130. The torque command 136 and feedback signal 140 together form a torque command loop 142 from which a continuous and adaptive control of the engine 102 may be accomplished. The shift logic 128 is in communication with the launch/creep controller 130 to intercept the torque command 136 and/or the torque command loop 142. The shift logic 128 intercepts the torque command 136,142 in order to receive a target clutch torque 144 embedded therein. The launch/creep controller 130 may implement power launch shifts or power creep shifts using a variety of decision making arrangements. In an exemplary approach the torque command loop 142 may be designated a creep loop when the pedal sensor 132 indicates a pedal depression less than a predetermined amount such as 25% with an engine speed sensor 134 indicating an engine speed above idle. A creep loop is a command loop 142 that moves a vehicle slowly forward on an incline as opposed to moving forward with intent to accelerate. Similarly, in another exemplary approach the torque command loop 142 may be designated a launch loop when the pedal depression is greater than a predetermined amount such as 25% and the engine speed sensor 134 indicates an accelerating engine 102. A launch loop is a command loop 142 that is indicative of a vehicle moving forward with the intent to accelerate to speed.

In addition to the target clutch torque 144, the shift logic 128 may also receive information from additional signals such as a clutch temperature signal 146 and a gear selection signal 148 from a gear selection logic 149. The launch/creep controller 130, the shift logic 128 and the gear selection logic 149 may be a portion of a transmission controller 150 in one exemplary example. The shift logic 128 utilizes these signals to allow instruct the clutch control assembly 126 on how and when to effectuate a shift between transmission gears 122,124. In launch situations, the need to shift may arise when the on clutch (the clutch temperature signal 146) starts to exceed a temperature threshold (e.g., beginning to overheat) and it is desirable for the transmission assembly 104 to launch on the other clutch. Additionally, in launch situations when a less than optimum gear is selected (in one example too high a gear initially selected) the need to shift may arise to move into a more appropriate gear. This may be important if the shift during launch is needed when the vehicle is on a steep grade. Also, during creeping to a halt on a steep grade it may be necessary to shift while the driver is still on the throttle. The shift logic 128 utilizes these inputs 136, 142, 144, 146, 148 in order to direct the clutch control assembly 126. Although a selection of inputs have been identified for the shift logic 128 and launch/creep controller 130, a plurality of additional inputs may be utilized in addition to those identified.

When the system recognizes a power launch or a power creep situation and the shift logic 128 indicates the necessity for a shift of gears, the clutch control assembly 126 must facilitate the transition between an off-going clutch and an on-coming clutch. In the above exemplary example, if an upshift from first gear to second gear is needed during a launch acceleration, the clutch control assembly 126 must transition from the first clutch (off-going) 110 to the second clutch (on-coming) 112. This is accomplished by removing the torque from the off-going clutch and increasing torque on the on-coming clutch. However, during power launch shifts or powered creep shifts it is desirable to maintain a constant transmission torque on the drivetrain 120. An exemplary method is provided that provides a quick and smooth transition between an off-going clutch and an on-coming clutch and maintains a torque on the drivetrain 120.

Figure 2:
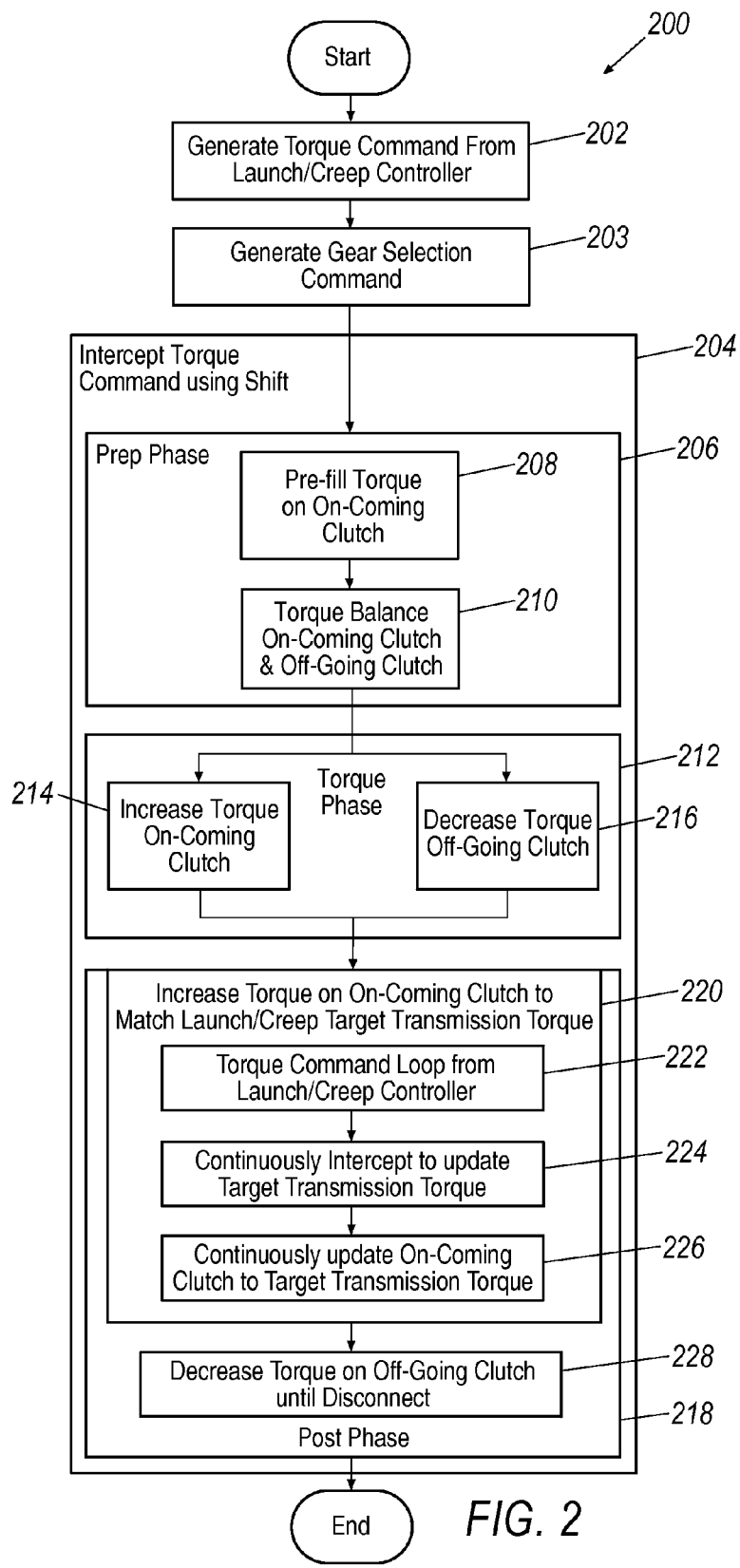
FIG. 2 is a diagram illustrating an exemplary method of controlling a dual clutch transmission.
Figure 3:
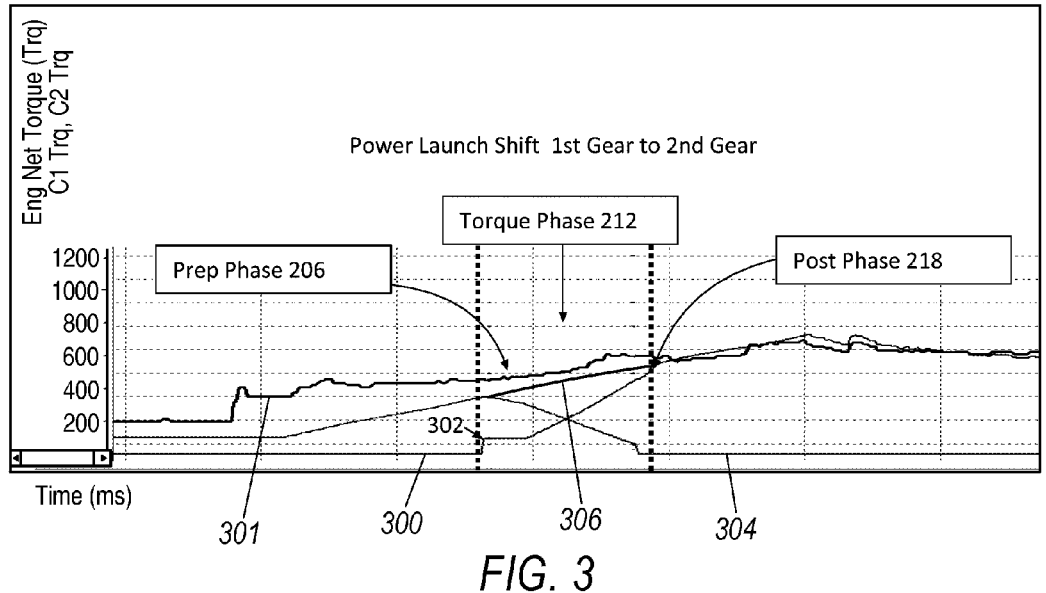
FIG. 3 is a graphical illustration of the exemplary method shown in FIG. 2 indicating a power launch shift.
Figure 4:
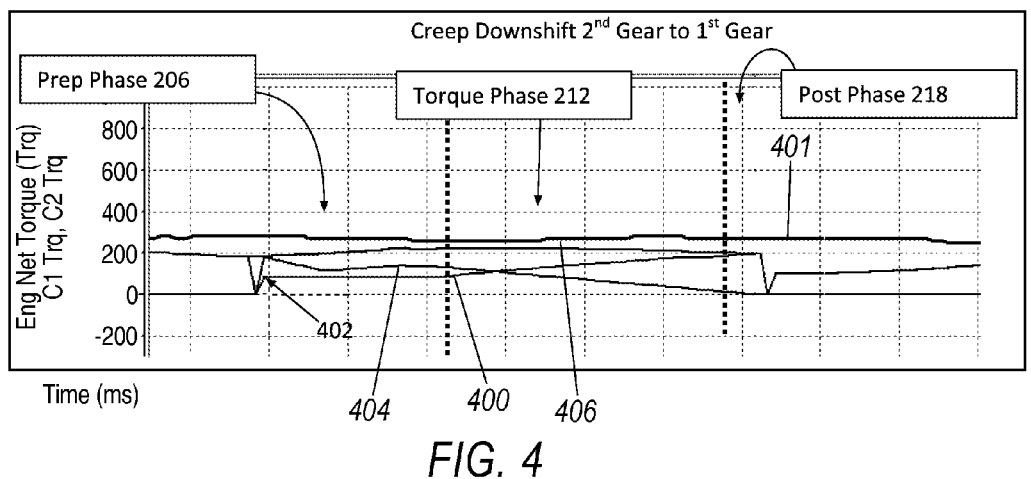
FIG. 4 is a graphical illustration of the exemplary method shown in FIG. 2 indicating a creep downshift.

Referring now to FIGS. 2, 3 and 4, the exemplary method for dual clutch transmission 200 is provided. For the purposes of simplicity, method steps (200) will refer to FIG. 2, elements (300) will refer to FIG. 3, and elements (400) will refer to FIG. 4. FIG. 3 is an exemplary illustration of a shift from a first gear into second gear during a powered launch shift. FIG. 4 is an exemplary illustration of a shift from second gear down to first gear during a powered creep shift. The method includes generating a torque command from a launch/creep controller 202. The method further includes generating a gear selection command 203. The torque command 136 includes a target clutch torque 144 indicative of the present torque provided to the driveline 120. The method intercepts the torque command using the shift logic 204. The shift logic than implements a preparation phase 206. The preparation phase 206 increases torque on the on-coming gear to a pre-fill torque 208. In the powered launch shift in FIG. 3, this adds pre-fill torque (302) to on-coming clutch 112 (300). In the powered creep shift in FIG. 4, this adds pre-fill torque (402) to on-coming clutch 112 (400). The pre-fill torque (302,402) maybe any value of baseline torque to prepare the on-coming clutch 112. In an exemplary approach the pre-fill torque is contemplated to be a plate-touch-point torque which is the torque necessary for the plates on the clutch to touch. The preparation phase 206 also includes torque balancing 210 the off-going clutch 110 and the on-coming clutch 112 (400) relative to the engine torque (301, 401). In the powered launch shift this unlocks off-going clutch 110 (304). In the powered creep shift this unlocks off-going clutch 110 (404).

The exemplary method 200 then has the shift logic 204 implement a torque phase 212 transferring toque from the off-going clutch to the on-coming clutch. The torque phase 212 increases torque on the on-coming clutch (300, 400) towards the target clutch torque (306,406) 214. Simultaneously, the torque phase 212 decreases torque on the off-going clutch (304, 404) 216. Both the on-coming clutch (300, 400) and the off-going clutch (304, 404) remain unlocked and in a slipping state during the torque phase 212. The combination of the torque on the on-coming clutch (300, 400) and the torque on the off-going clutch (304, 404) maintains the target clutch torque (306, 406) throughout the torque phase 212. This allows the drivetrain 120 to be supplied with unbroken torque during the handover from the off-going clutch (304, 404) to the on-coming clutch (300, 400).

The exemplary method may also include a post phase 218 implemented by the shift logic. The post phase 218 increases torque on the on-coming clutch (300,400) until it matches the target clutch torque (306,406) 220. In one exemplary approach, this is accomplished by generating a torque command loop from the launch/creep controller 222 and continuously intercepting the torque command loop to update the target clutch torque 224. The torque on the on-coming clutch (300,400) is continuously adjusted to match the updated target clutch torque 226. The off-going clutch (304, 404) is decreased in torque until it disconnects 228. This allows the on-coming clutch (300, 400) to continuously adjust to the target clutch torque (306, 406) as the vehicle continued on the launch or creep in the new gear.

The exemplary method set forth above provides a way to shift without significantly disturbing the torque to the driveshaft during launches and creeping to a stop on a grade. It accomplishes this by allowing both on-coming and off-going clutches to slip during the transfer such that their combined torques maintain a smooth and consistent transmission torque during the handover.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

It should be understood that the shift logic 128, the launch/creep controller 130, and the engine controller 138 may include computer-executable instructions such as the instructions of the software applications on a processor, where the instructions may be executable by one or more computing devices. In general, a processor (e.g., a microprocessor) receives instructions, e.g., from a memory, a non-transitory computer-readable medium, etc., and executes these instructions, thereby performing one or more processes, including one or more of the processes described herein. Such instructions and other data may be stored and transmitted using a variety of computer-readable media. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The shift logic 129, the launch/creep controller 130, and the engine controller 138 may take many different forms and include multiple and/or alternate components and facilities. Indeed, additional or alternative components and/or implementations may be used, and thus the above controller examples should not be construed as limiting.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of controlling a dual clutch transmission, including an on-coming clutch and an off-going clutch, comprising:
   generating a torque command from a launch/creep controller, the torque command including a target clutch torque;
   reading the torque command using a shift logic;
   implementing a preparation phase comprising:
      increasing torque on the on-coming clutch to a prefill torque;
      implementing a torque phase transferring torque from the off-going clutch to the on-coming clutch, the torque phase comprising:
         increasing torque on the on-coming clutch towards the target clutch torque, said on-coming clutch remaining unlocked during the transfer; and
         decreasing torque on the off-going clutch, said off-going clutch remaining unlocked during the transfer;
   wherein as the off-going clutch torque is decreasing, the combination of the on-coming clutch torque added to the off-going clutch torque maintains the target clutch torque.

2. A method of controlling a dual clutch transmission as described in claim 1, further comprising:
   implementing a post phase comprising:
      increasing torque on the on-coming clutch until it matches the target clutch torque; and
      decreasing torque on the off-going clutch until the off-going clutch disconnects.

3. A method of controlling a dual clutch transmission as described in claim 2, wherein the post phase comprises:
   generating a torque command loop from the launch/creep controller;
   continuously reading the torque command loop to update the target clutch torque by the shift logic; and
   continuously adjusting torque on the on-coming clutch to match the updated target clutch torque.

4. A method of controlling a dual clutch transmission as described in claim 1, wherein the off-going clutch and the on-coming clutch remain in a slipping state during the torque phase.

5. A method of controlling a dual clutch transmission as described in claim 1, wherein the shift logic is in communication with a clutch temperature signal, said shift logic implementing the torque phase in response to the clutch temperature signal.

6. A method of controlling a dual clutch transmission as described in claim 1, wherein the shift logic is in communication with a gear selection signal, said shift logic implementing the torque phase in response to the gear selection signal.

7. A method of controlling a dual clutch transmission as described in claim 3, wherein the torque command loop comprises a creep loop when a pedal signal is below a predetermined value.

8. A method of controlling a dual clutch transmission as described in claim 3, wherein the torque command loop comprises a launch loop when a pedal signal is above a predetermined value.

9. A dual clutch transmission comprising:
   a launch/creep controller configured to generate torque command including a target clutch torque;
   a first clutch;
   a second clutch;
   a clutch control assembly in communication with said launch/creep controller, said first clutch, and said second clutch, said clutch control assembly including a shift logic configured to read said torque command from said launch/creep controller, said shift logic configured to power shift by:
   implement a torque phase transferring torque from the first clutch to the second clutch, the torque phase comprising:
   increasing torque on the second clutch towards the target clutch torque; and
   simultaneously decreasing torque on the first clutch;
   wherein the first clutch and the second clutch are both in a slipping state that maintains the target clutch torque during the transfer.

10. A dual clutch transmission as described in claim 9, wherein said shift logic is further configured to:
   implement a preparation phase prior to said torque phase comprising:
   increasing torque on the second clutch to a prefill torque.

11. A dual clutch transmission as described in claim 10, wherein said preparation phase further comprises:
   torque balancing the first clutch and the second clutch, wherein the torque on the first clutch combined with the torque on the second clutch approximates an engine torque.

12. A dual clutch transmission as described in claim 10, wherein said prefill torque comprises a plate-touch-point torque.

13. A dual clutch transmission as described in claim 9, wherein said shift logic is further configured to:
   implement a post phase comprising:
   increasing torque on the second clutch until it matches the target clutch torque; and
   decreasing torque on the first clutch until the first clutch disconnects.

14. A dual clutch transmission as described in claim 13, wherein the post phase comprises:
   generating a torque command loop from the launch/creep controller;
   continuously reading the torque command loop to update the target clutch torque; and
   continuously adjusting torque on the second clutch to match the updated target clutch torque.

15. A dual clutch transmission as described in claim 9, wherein said shift logic is in communication with a clutch temperature signal, said shift logic implementing said torque phase in response to said clutch temperature signal indicating an overheating transmission.

16. A dual clutch transmission as described in claim 9, wherein said shift logic is in communication with a gear selection signal, said shift logic implementing said torque phase in response to said gear selection signal indicating a wrong gear selection.

17. A dual clutch transmission as described in claim 13, wherein said first clutch and said second clutch remain unlocked during said post phase.

18. A system for operating a dual clutch transmission, including a launch/creep controller and a clutch control assembly including a shift logic, the clutch control assembly configured to:
   read a torque command from the launch/creep controller using the shift logic, the torque command including a target clutch torque;
   engage a preparation phase comprised of:
   increasing torque on an on-coming clutch to a prefill torque;
   engage a torque phase comprising:
   transferring torque between an off-going clutch and said on-coming clutch by simultaneously decreasing the off-going clutch torque and increasing the on-coming clutch torque, wherein said off-going clutch and said on-coming clutch are both in a slipping state that maintains the target clutch torque during the transfer.

19. A system as described in claim 18, wherein said clutch control assembly is further configured to:
   implement a post phase comprising:
   increasing torque on the on-coming clutch until it matches the target clutch torque; and
   decreasing torque on the off-going clutch until the off-going clutch disconnects.

20. A system as described in claim 19, wherein the post phase further comprises:
   generating a torque command loop from the launch/creep controller;
   continuously reading the torque command loop to update the target clutch torque; and
   continuously adjusting torque on the on-coming clutch to match the updated target clutch torque.

* * * * *